United States Patent [19]

Achelpohl

[11] 4,244,772
[45] Jan. 13, 1981

[54] APPARATUS FOR APPLYING TRANSVERSE WELD SEAMS TO SUPERPOSED WEBS OF PLASTICS FILM

[75] Inventor: Fritz Achelpohl, Lengerich of Westphalia, Fed. Rep. of Germany

[73] Assignee: Windmoller & Holscher, Lengerich, Fed. Rep. of Germany

[21] Appl. No.: 17,076

[22] Filed: Mar. 2, 1979

[30] Foreign Application Priority Data

Mar. 6, 1978 [DE] Fed. Rep. of Germany ....... 2809515

[51] Int. Cl.³ .......................... B32B 31/00; B30B 5/04
[52] U.S. Cl. ................................. 156/515; 156/583.5
[58] Field of Search .................. 156/583.5, 583.1, 515, 156/252

[56] References Cited

U.S. PATENT DOCUMENTS 3,622,421 11/1971 Cook ..................................... 156/290
4,115,183 9/1978 Achelpohl .......................... 156/583.5

FOREIGN PATENT DOCUMENTS 984587 2/1965 United Kingdom ...................... 156/272
1046329 10/1966 United Kingdom ...................... 156/510
1083188 9/1967 United Kingdom .................. 156/583.1
1264568 2/1972 United Kingdom .................. 156/583.1
1455570 11/1976 United Kingdom .................. 156/583.1

Primary Examiner—Douglas J. Drummond
Attorney, Agent, or Firm—Fleit & Jacobson

[57] ABSTRACT

In the production of transverse weld seams at intervals along a web of travelling superposed plastics films, the problem of weaknesses caused by shrinkage of each seam as it cools is solved by forming a loop in the web adjacent the intended seam and slackly clamping the web on each side of the loop before the seam is applied and the web released again.

5 Claims, 11 Drawing Figures

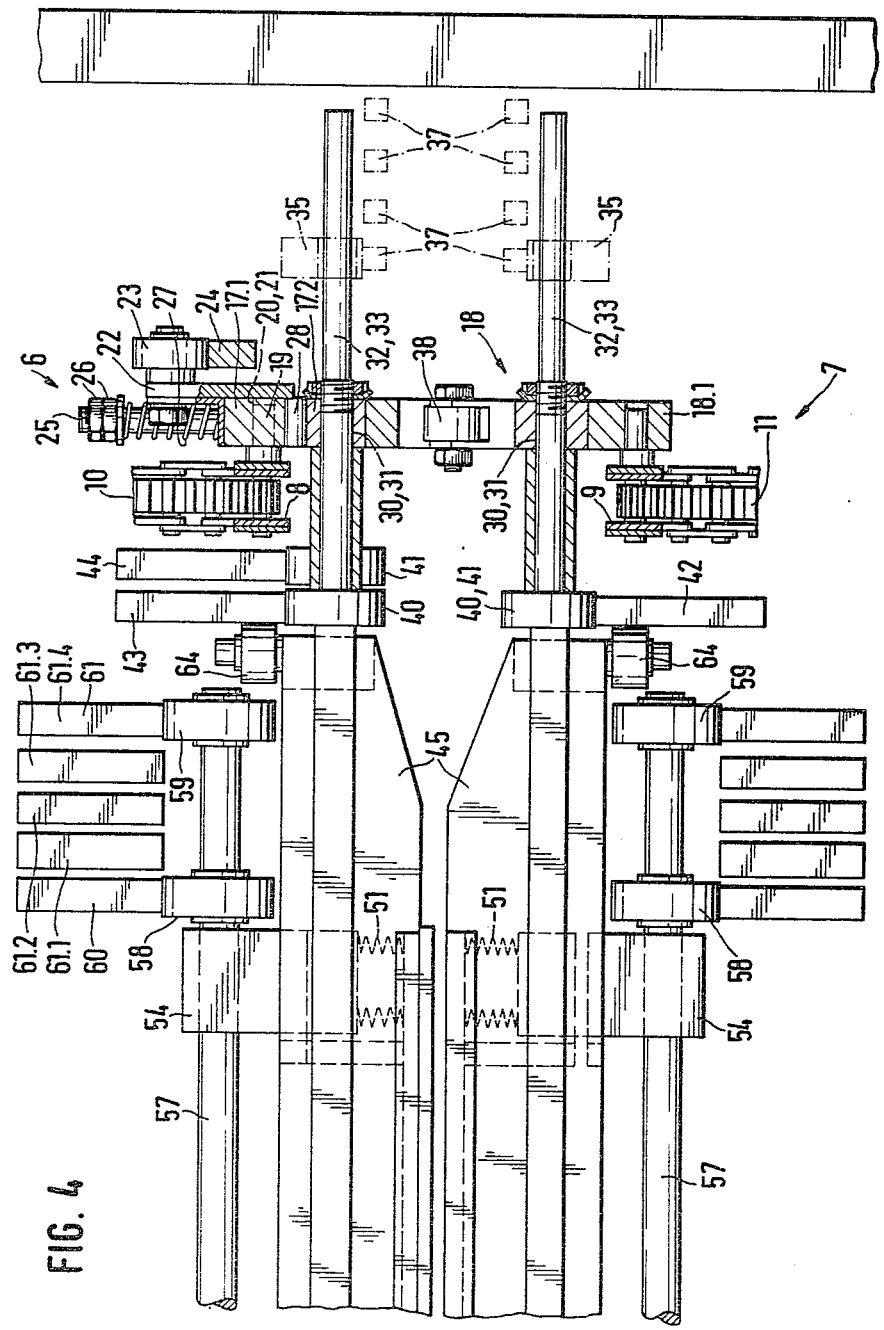

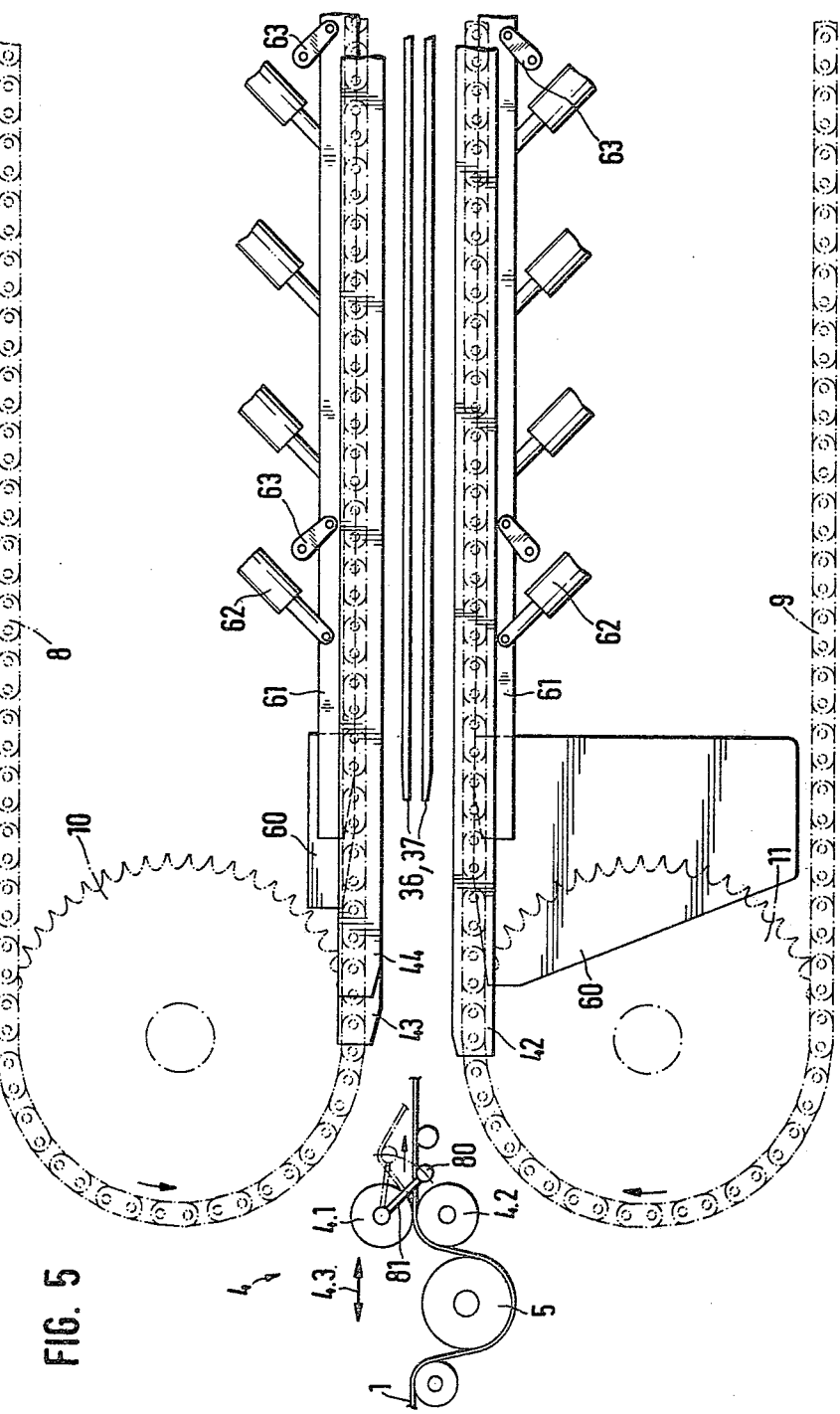

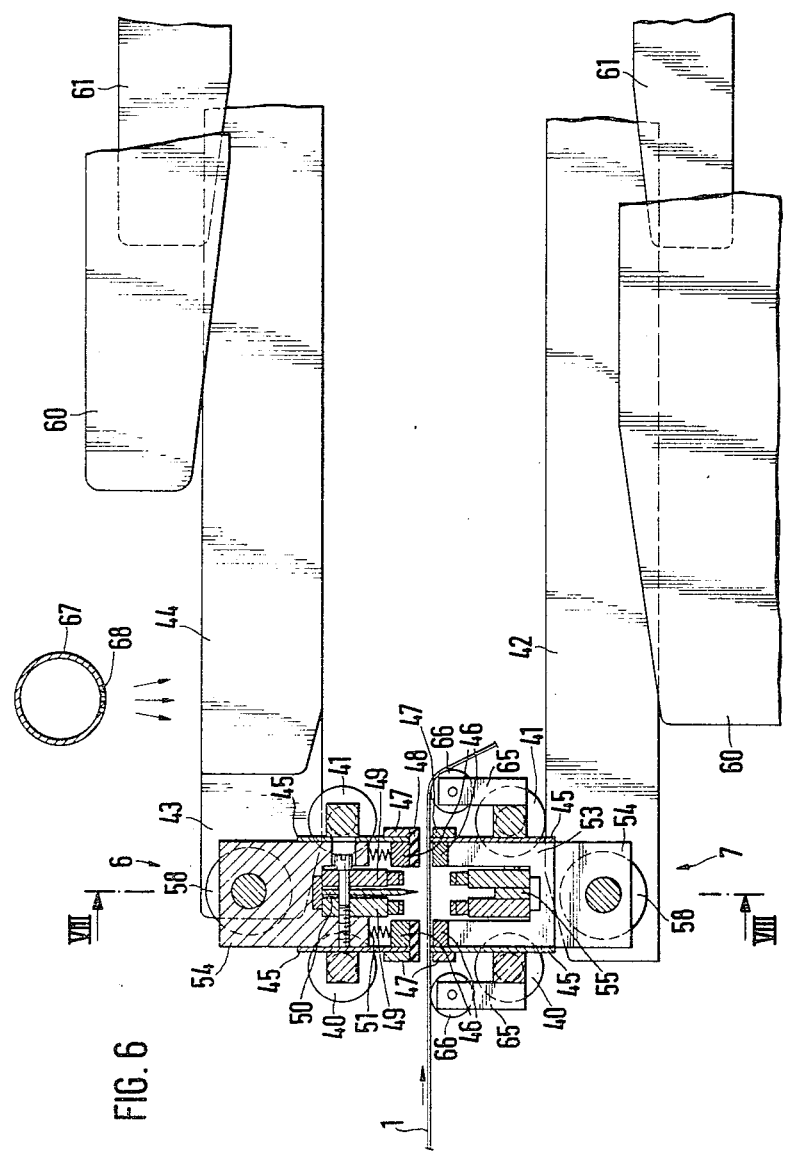

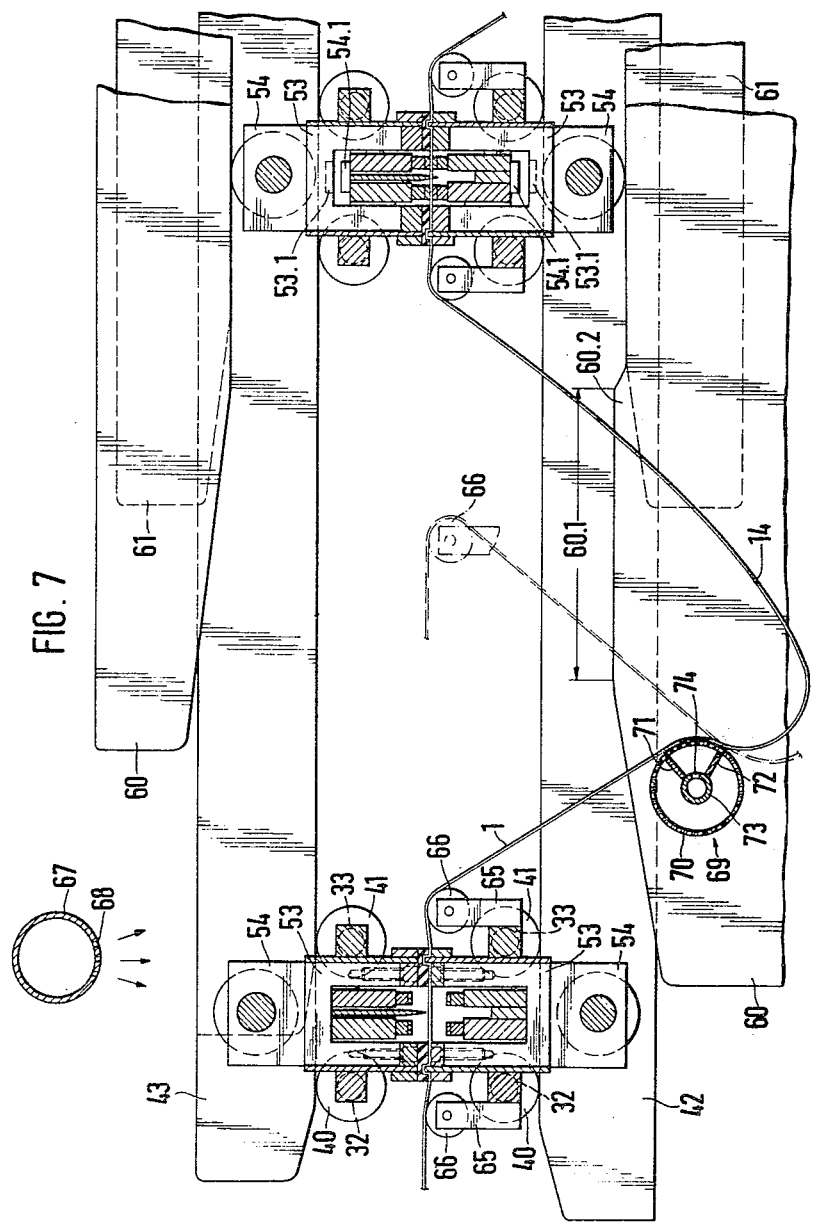

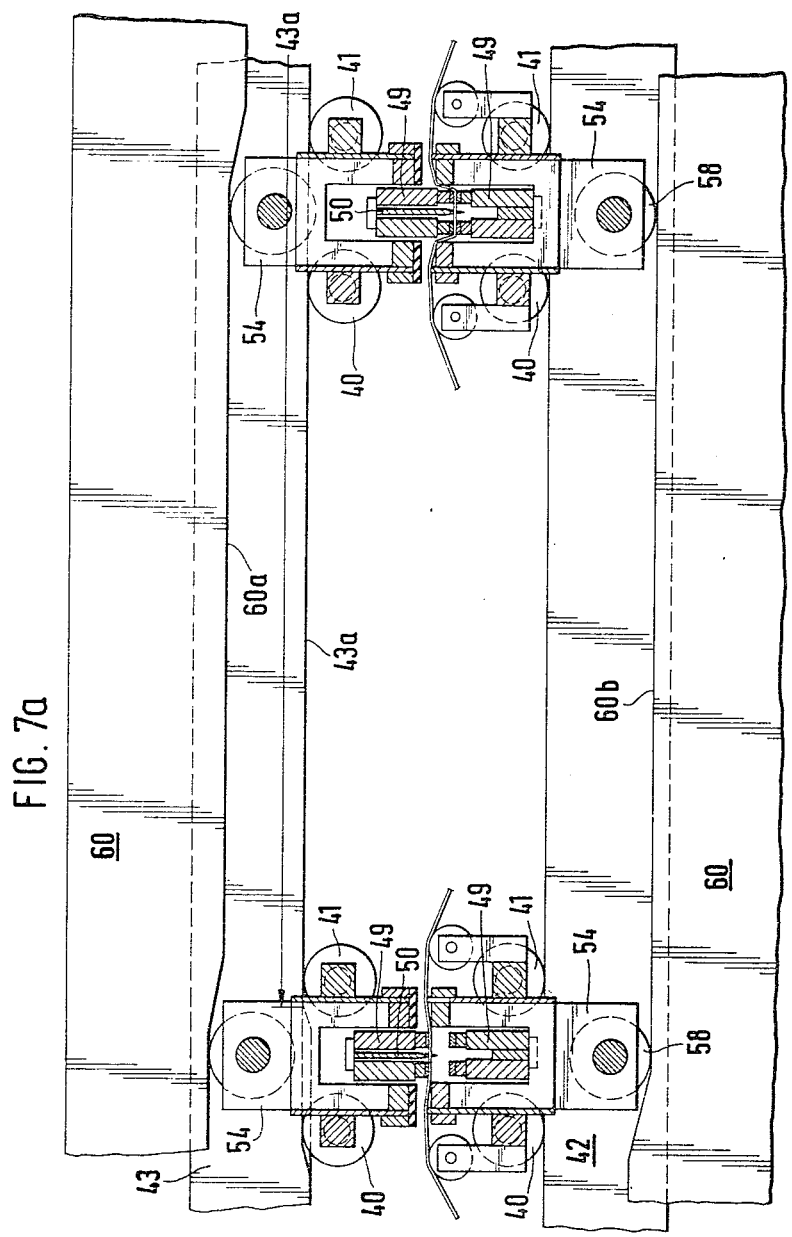

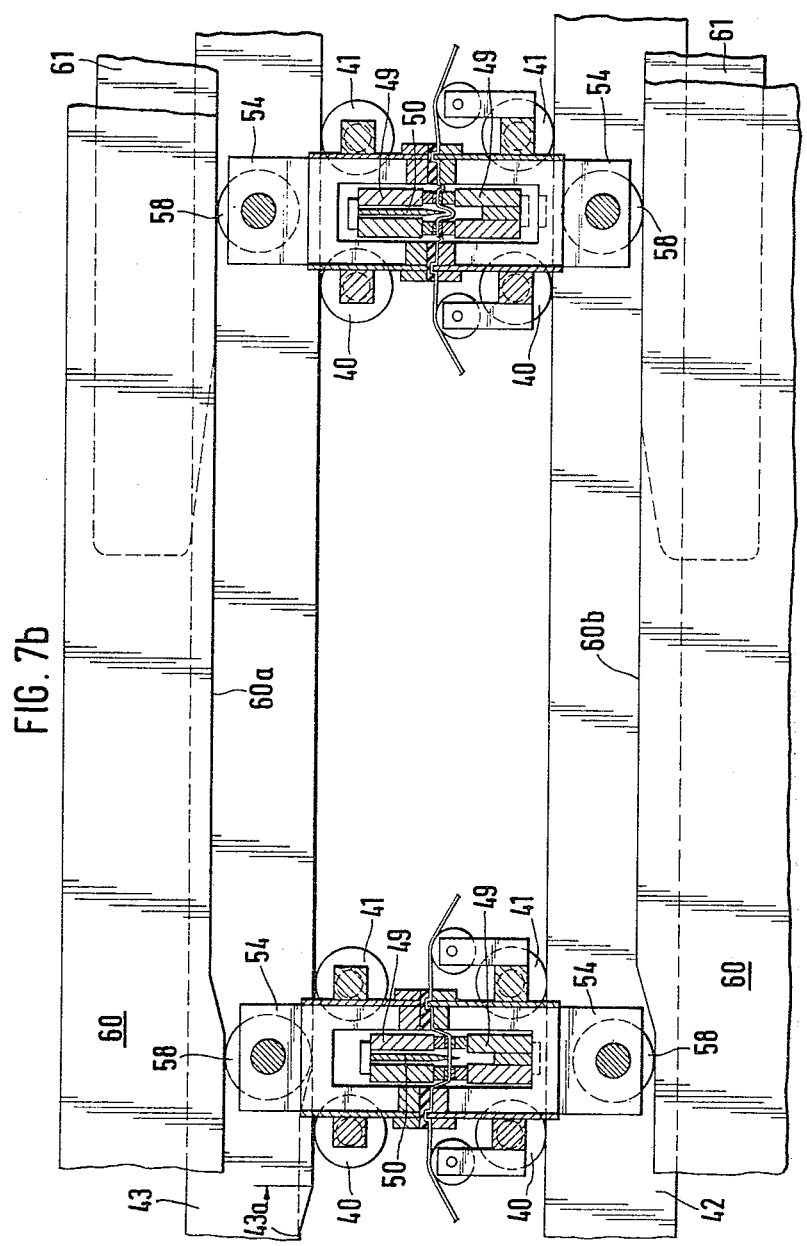

APPARATUS FOR APPLYING TRANSVERSE WELD SEAMS TO SUPERPOSED WEBS OF PLASTICS FILM

The invention relates to a method of applying transverse weld seams to superposed webs of plastics film, preferably in the production of chains of sacks from semi-tubular plastics webs, as well as to an apparatus for performing this method.

In a previously known machine for applying transverse weld seams to superposed webs of plastics film, comprising a plurality of tool holders which are guided by endless chains in pairs along a planar path which is traversed by the webs and at both sides of the webs, act in opposition, enclose the webs between each other, are disposed transversely to the webs and each comprise two parallel clamping bars between which the welding jaws of a welding tool are displaceably guided, the clamping bars are secured to a respective one of two co-operating pairs of guide plates which enclose a respective welding bar between each other, one of the welding bars being provided with a perforating knife. The movements of the guide plates and welding bars are synchronised so that application of the welding bars, welding and perforation as well as lifting the welding bars off the web take place whilst the web is still clamped between the co-operating guide plates, so that no tension can be exerted on the weld seams from the exterior. However, it has been found that particularly when relatively wide weld seams are being formed the latter are weakened because the seams shrink during cooling and, since a relatively short web section is clamped between the guide plates, the shrinkage stresses cannot be relieved by pulling in web material. Opening of the clamping bars would not help because the web is also tensioned beyond the clamping bars.

It is therefore the object of the present invention to provide a method as well as an apparatus for applying strong weld seams to superposed webs of plastics film, the seams suffering no loss in strength as a result of shrinkage stresses.

According to the invention, this problem is solved in a method of the aforementioned kind in that a loop is formed in the zone where the weld seam is to be formed and the webs are so clamped at both sides of the loop that the webs are held slack, whereafter the webs are provided with a transverse weld seam and, after cooling and shrinkage of the weld seam, released again. Depending on the type of material of the webs to be welded together, the weld seams may shrink by 30% and more, which leads to considerable stresses and the associated loss in the strength of the weld seams. In the method according to the invention, so much web material has been pulled in between the clamping positions that the transverse weld seam passed between the slackly held webs can cool and shrink without stress. The transverse weld seams made by the method according to the invention thus have a much higher strength than do the weld seams made by the machine described above.

If, for example, chains of bags are to be made from semi-tubular webs of plastics, it is necessary to apply transverse perforations between the transverse weld seams that weld off the individual bags. According to a further form of the method according to the invention, therefore, provision is made for the webs to be initially stretched in the zone of the transverse weld seam to be formed and to be provided with a transverse perforation and then relaxed again to form the loop. For the purpose of applying the transverse perforations, the webs are temporarily overstretched and subsequently held slack again in the manner according to the invention for the purpose of applying the transverse weld seam or seams.

An apparatus for performing the method according to the invention of the kind mentioned above is characterised according to the invention in that for the purpose of forming the loop, one welding jaw is constructed to be movable between the clamping bars of the opposite tool holder. By means of such movement of one welding jaw, a loop pulled in by the welding jaw is formed between the clamping bars and is subsequently fixed by bringing the clamping bars together. If the welding jaws are moved apart at both sides of the conveying plane of the webs to be welded together, then the web is held slack between the clamping bars. By moving the welding jaws together in the conveying plane of the webs, one can thus form a weld seam which can cool and thereby shrink without stress.

If the webs are at the same time to be provided with lines of transverse perforations, a perforating knife between the welding bars of the loop-forming welding jaw projects therebeyond. This perforating knife remains in engagement with the perforations formed thereby in the webs, even while the welding jaw is being moved back into the conveying plane, so that it centres the web section which is held slack and clamped between the clamping bars.

An example of the invention will now be described in more detail with reference to the drawing, wherein:

FIG. 4 is an enlarged representation of the right-hand side of FIG. 1 or a section on the line IV—IV in FIG. 3;

FIG. 5 is a diagrammatic side elevation of the inlet side of the apparatus with the mechanical control cams and electric conductor rails, especially the tools being omitted;

FIG. 6 is a section on the line VI—VI in FIG. 2 of a clamping, cutting and welding tool before it runs up onto the control cam;

FIG. 7 shows two clamping, welding and cutting tools after clamping of the web of film and sectioned on the line VII—VII in FIG. 2;

FIGS. 7a and 7b illustrate the FIG. 7 clamping, welding and cutting tools in the various operating positions for the formation of the loop and for welding;

Figure 1:
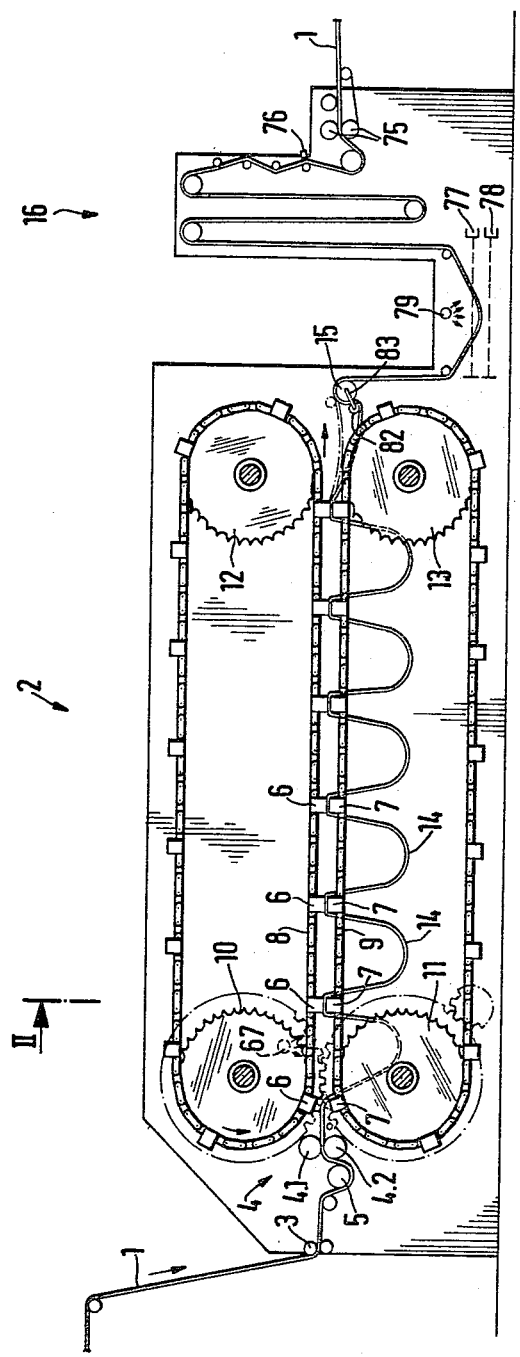
FIG. 1 is a side elevation of the welding apparatus.

A web 1 is withdrawn in known but unillustrated manner from a supply reel and fed to an apparatus 2 for making chains of sacks. The web may pass through a printing press between the supply reel and apparatus 2 and there be printed. It may consist of a flattened tube, of a half-tube open at one side or of a flattened tube of which the upper layer has been longitudinally slit open at the centre. The apparatus may also be fed with two half-tubes open at one side. It is fed to a pair of tension rollers 4 by way of a pair of guide rollers 3. In front of the pair of tension rollers 4 there is a guide roller 5 which achieves a large enveloping angle for the lower tension roller 4.2. The web 1 then arrives between a pair of tools 6, 7 disposed on chains 8, 9 provided at both sides of the pair of tools 6, 7. The chains 8, 9 run over sprockets 10 to 13. Pairs of tools are arranged at equal intervals on the chains. The pair of tension rollers 4 runs either more rapidly or at the same speed as the chains 8, 9. In the former case, the web 1 will, as seen in FIG. 1, form loops 14 between the individual pairs of tools 6, 7 and in the latter case the web 1 runs through the apparatus 2 in a stretched position. The pairs of tools 6, 7 comprise perforating and welding means with which the web 1 can be transversely welded or transversely perforated. At the sprockets 12, 13, the pairs of tools 6, 7 open again and release the web 1. It is withdrawn by a suction roller 15 which turns at the same speed as the web and, by way of a cooling section 16, along which the hot seems can cool off, it arrives at an outlet (not shown) in which the finished chain of sacks is wound up and otherwise processed, for example packaged.

Figure 2:
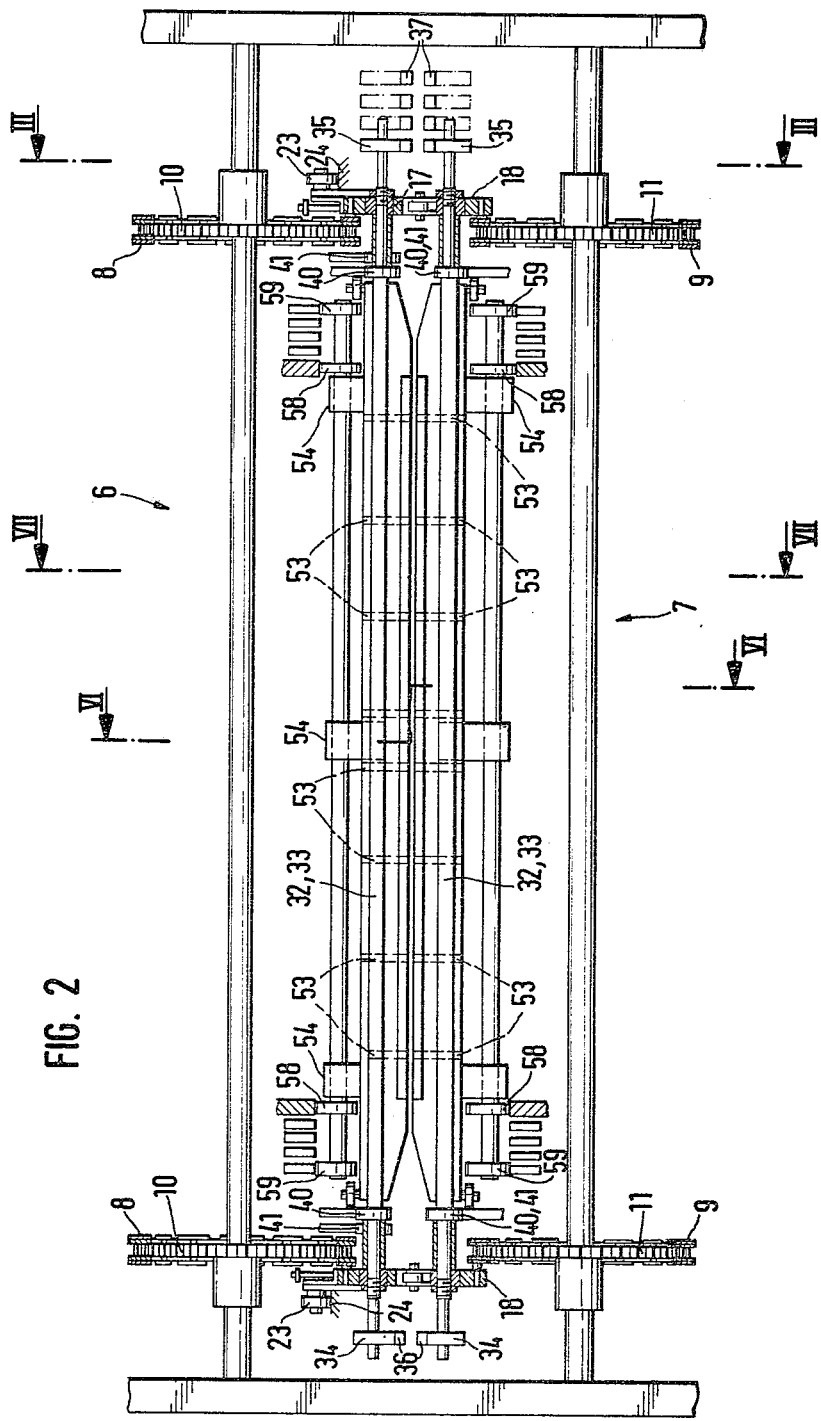
FIG. 2 is a section through the apparatus on the line II—II in FIG. 1.
Figure 3:
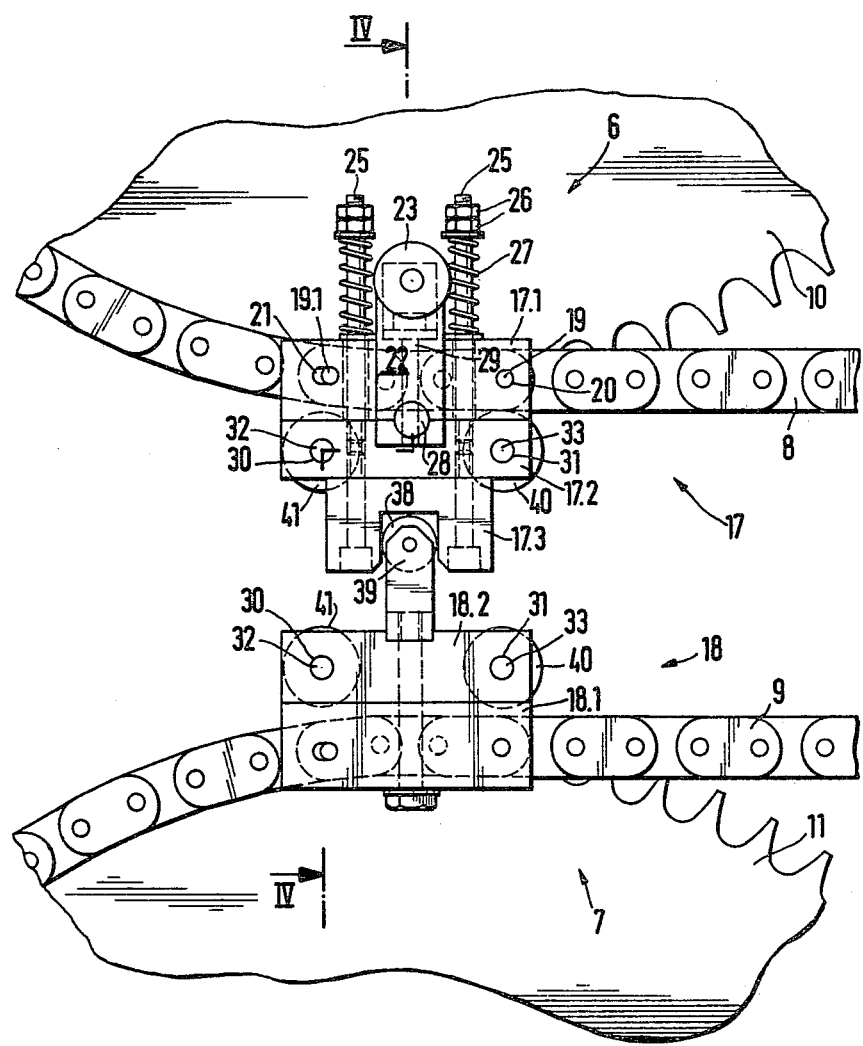
FIG. 3 is an enlarged section on the line III—III in FIG. 2.
Figure 8:
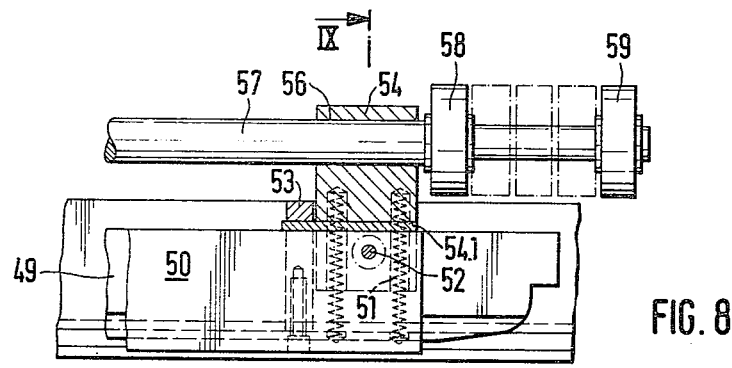
FIG. 8 is a section on the line VIII—VIII in FIG. 9.

FIG. 2 illustrates a section through the apparatus 2. It shows an elevation of the pair of tools 6, 7 taken from the side at which the web is supplied. Each pair of tools 6, 7 comprises securing plates 17, 18 at both sides and these are made in two or three parts (FIG. 3). One part 17.1 is connected to a pin 19 projecting from a chain link and seated in a hole 20 of the part 17.1. A second pin 19.1 of the following chain link is loosely movable in an elongate hole 21. Connected to the part 17.1 there is a strap 22 on which a roller 23 is loosely rotatable. The roller 23 runs on a bar 24 that is fixed with respect to the frame and prevents sagging of the part 17.1 or of the chains 8.

A guide member 17.2 which is part of the securing plate 17 is connected to the part 17.1 by stud bolts 25 which are securely screw-connected in the guide member 17.2, project beyond the part 17.1 and on which lock-nuts 26 are screwed. Between these and the part 17.1, stressed compression springs 27 cause the guide members 17.2 to abut against the parts 17.1. Both the parts 17.1 and 17.2 have a common bore centrally of the parting plane for receiving a pin 28 which is screw-connected to the part 17.1 by a bolt 29.

Bifurcated members 17.3 are securely screw-connected to the guide members 17.2 and rollers 38 secured to the securing plates 18 can engage in their bifurcations. The rollers 38 are loosely rotatable in bearing heads 39 which are screw-connected to the parts 18.2 of the end plates 18.

The parts 18.1 of the end plates 18 have, in the same way as the parts 17.1, bores and elongate holes engaged by pins which project laterally from the chain and take the end plates 18 with them. The parts 17.2 and 18.2 are provided with bores 30, 31 in which bars 32, 33 are mounted which project outwardly at both sides beyond the plane of the sprockets. On their outer ends, the bars 32, 33 carry brush holders 34, 35. The brushes of the brush holders 34 co-operate with neutral conductors 36 and the brush holders 35 are arranged on the right-hand side of the machine at which the operator stands and their brushes commutate with the positive conductor rails 37 that are fixed with respect to the frame. Altogether there are four positive conductor rails 37 for each tool 6, 7, a different rail for each of the successively arriving tools 6, 7. For this reason the brush holders 35 are secured to the bars 32, 33 at a staggered lateral spacing from one tool 6, 7 to the other so that every first to fourth pair of tools 6, 7 is associated with a different positive conductor rail. The brush of the fifth pair of tools 6, 7 to arrive will then again commutate with the positive conductor rail 37 just vacated by the brushes of the first pair of tools 6, 7, in the manner described in DT-AS No. 1,704,401.

Rollers 40, 41 are loosely rotatably mounted on the bars 32, 33 at both ends of the pair of tools 6, 7. The rollers 40, 41 of the tools 7 roll along control rails 42 which are fixed with respect to the frame. The rollers 40, 41 of the tools 6 are laterally staggered. They roll along juxtaposed control rails 43, 44. The control rails 42 to 44 are provided with run-up ramps. The control rails 43, 44 are staggered in the longitudinal direction so that the rollers 40, 41 are simultaneously applied to the control rails 43, 44 as they run past. They are set somewhat lower than the level corresponding to guiding by the chains 8. In this way the guide members 17.2 are lifted off the parts 17.1 and made independent of the accuracy of the chains 8. The rollers 38 engage in the bifurcated parts 17.3 and take over the guiding of the guide members 17.2 which are now no longer fed by the chains 8 but by the chains 9. After leaving the control rails 43, 44, the guide members 17.2 are pulled towards the parts 17.1 and fixed in the longitudinal direction by the pins 28. The rollers 38 will then no longer engage in the bifurcated part 17.3.

In their longitudinal direction, the pairs of tools 6, 7 are secured against displacement by rollers 64 which roll along the sides of control rails 42, 43 fixed with respect to the frame; in relation to these rails, they exhibit only slight play.

Figure 9:
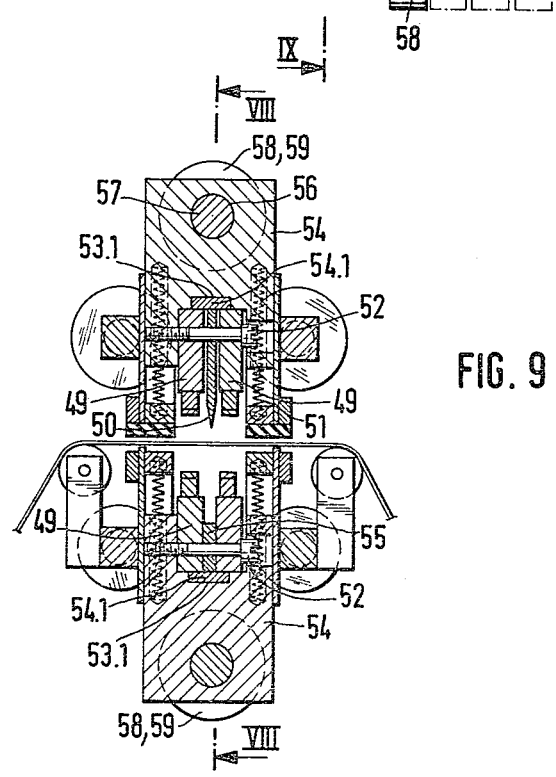
FIG. 9 is a section on the line IX—IX in FIG. 8.

Supporting bars 46, 47 are provided on guide plates 45 (FIG. 6) secured to the bars 32, 33. The supporting faces of the supporting bars of the upper tool 6 are flush with the guide plates 45. A resilient rubber bar 48 is applied to them. The guide plates 45 of the lower tool 7 project upwardly beyond the supporting bars 46, 47. When the rollers 40, 41 run onto the fixed control rails 43, 44, the web 1 disposed between the pairs of tools 6, 7 is clamped in so far that the guide plates 45 of the lower tool 7 penetrate into the rubber bars 48 of the upper tool 6 and the lower supporting bars 46, 47 lie against the rubber bars 48. The guide plates 45 are held at a spacing from each other by spacer members 53 which are U-shaped in cross-section. Between the guide plates 45 of the upper tool 6, welding bars 49 and a perforating knife 50 are held in guide members 54 and displaceably guided relatively to the guide plates 45 which are supported in relation to the supporting bars 46 by springs 51. The welding bars 49 and the perforating knife 50 are, in accordance with FIG. 9, securely screw-connected to the guide members 54 by bolts 52. The lower tool 7 is practically of the same construction as the upper tool 6, except that a spacer member 55 is provided instead of the perforating knife 50. The guide members 54 are secured against falling out by abutment bars 54.1 which engage in grooves 53.1 in spacer members 55 adjacent the guide members 54.

The guide members 54 comprise bores 56 in which roller bearing bars 57 are tightly fitted, on the ends of which two rollers 58, 59 are secured at both sides for each tool 6, 7, the rollers 58 rolling along control rails 60 fixed with respect to the frame. The rollers 59 run along control bars 61 which are displaceable in the vertical direction and of which a plurality, in this example four, are juxtaposed. The rollers 59 are laterally offset on the roller bearing bars 57 with each successive tool 6, 7 so that the rollers 59 of the first pair of tools 6, 7 co-operate with the control bar 61.1, the rollers of the second with the control bar 61.2 etc. and the rollers of the fifth pair of tools 6, 7 again co-operate with the control bar 61.1.

The control bars 60, 61 are in staggered relationship and have run-up ramps. When the rollers 58 run onto the control bars 60, the guide members 54 and thus the welding bars 49 as well as the perforating knife 50 of the upper tool 6 are brought to the operative position, i.e. the web 1 held between the guide plates 45 and the rubber bar 48 is perforated by the perforating knife 50 and the welding bars 49 are placed on the web 1 from both sides without the welding current being switched on. In order that the web 1 may be stretched during perforation and the tips of the perforating knife can penetrate into the web, the lower control bar 60 is provided with an elevation 60.2 along a section 60.1, whereby the lower welding bars 49 are lifted. Downstream of the elevation 60.2, the lower welding bars 49 are returned to the level of the supporting bars. Thereafter the rollers 40, 41 of the upper guide plates 45 reach a recess 43a of the control rail 43, whereby clamping of the web is relaxed. Immediately thereafter, the upper roller 58 runs onto a raised portion 60a of the upper rail 60 and the lower roller 48 runs into a recess 60b of the lower rail 60. The recess 60b and the raised portion 60a are synchronized so that the lower roller 58 drops slightly more than the upper roller 58 so that a small gap is formed between the welding tools, i.e. the web is no longer clamped between these tools. The right-hand side of FIG. 7a shows that a loop is pulled in between the lower guide plates 45, during this movement. After this loop has been pulled in, the rollers 41 and 40 of the upper guide plates 45 again reach the control rails 43, whereby the web is clamped between the guide plates. This is shown at the left-hand side of FIG. 7b. Shortly after the web has been clamped by the guide plates 45 with the loop lying therebetween, the rollers 58 likewise return onto the upper and lower rails 60, respectively, so that the actual basic position is reached again. This position is represented at the right-hand half of FIG. 7b, the rollers 58 having already run onto the control bars 61, the welding operation having commenced and the web 1 being transversely welded. During the entire control phase, the perforating knife remains in constant engagement with the web so as to avoid displacement of the web. In the illustrated example, welding beams 49 are shown adjacent both sides of the perforating knife 50. One of them need not be connected to the source of welding current so that one or two transverse welds can be carried out at will. After welding, the movable control bars 61 can be retracted out of the control plane by hydraulic cylinders 62. The control bars 61 are for this purpose articulated to the frame by levers 63. Retraction of the control bars 61 causes the welding bars 49 to be lifted off the weld seams.

The cam guide as described ensures that after welding the loop formed between the guide plates prior to welding makes sufficient material available between the guide plates 45 that are still clamped together so as to facilitate proper shrinkage of the weld seam.

Both welding bars 49 are, as described, advanced only by the lower chains 9 during the welding step so that they cannot move relatively to each other in the direction of travel and thus ensure efficient welding.

Rollers 66 are loosely rotatable in roller holders 65 secured to the lower bars 32, 33. The web 1 rolls over these and is fed to the pairs of tools 6, 7 by the feed rollers 4. To facilitate formation of the loops 14, a blow pipe 67 with downwardly directed blow holes 68 is fixed substantially in the vicinity of the axis of the sprockets 10 above the control rails 43, 44. By means of the air stream, the web 1 is pushed downwardly to start and facilitate formation of the loop.

The web 1 which already sags somewhat is engaged and withdrawn by a suction roller 69 disposed beneath the tools 7 and somewhat offset towards the blow tube 67 in the direction of travel of the web 1. The suction roller 69 consists of a tube 70 which rotates at a high speed, is apertured at the periphery and has its interior compartmented by plates 71, 72 secured to a central tube 73 fixed with respect to the frame. The plates 71, 72 subtend an angle of about 80° with the web 1. Air is sucked out of this chamber through bores 74 by way of the central tube 73. The suction effect disappears when the pair of tools 6, 7 has been advanced beyond the suction roller 69 and the roller 66 has reached a position shown in broken lines in FIG. 7, so that the web 1 touches the suction-free peripheral portion of the suction roller 69 and can separate from it. The suction roller 69 ensures that the loops will always be formed uniformly and thus the lengths of the sacks will always be the same.

Instead of the suction roller 69 or together with it a beater bar 80 (FIG. 5) may also become effective to form identical loops 14. The clamping faces of the tools 6, 7 leave only a narrow gap for the passage of the web 1, particularly just before closing of the clamping jaws. This more or less brakes the web so that the loops 14 exhibit differences, albeit slight ones. These slight differences in length can be balanced out by the beater bar 80. It extends over the entire width of the web and is connected at both sides to levers 81 which are rotatably mounted about the shaft of the tension roller 4.1 and are driven from the main shaft of the machine. During operation of the machine, the beater bar 80 pivots to and fro between the positions shown in full and chain-dotted lines. This causes the web 1 to be pulled back by a slight amount just before it is clamped tight by the clamping faces of the respective tool 6, 7, so that the loops will always be formed alike. This short return motion of the web 1 can also be achieved in that the pair of tension rollers 4 and the guide roller 5 are mounted on a common carriage (not shown) which can be displaced in the direction of the double arrow 4.3 from the main drive. Just before the clamping means of the tools 6, 7 are closed, the carriage is suddenly retracted through a small amount and, upon formation of the loops 14, move to its projected position.

The aforementioned suction roller 15 (FIG. 1) is of the same construction as the suction roller 69. Its surface with the suction effect extends substantially over the first quadrant. By continuously advancing the web 1, it absorbs the web tension that would arise when the last pair of tools 6, 7 holding the web in FIG. 1 opens and the last loop 14 would be suddenly pulled taut under the tension of the length of web disposed in the cooling section 16. This could cause an as yet hot weld seam to tear.

The suction roller 15 may advantageously also have imparted to it a rhythmically accelerated and retarded peripheral speed by driving it through variable gearing. It then assumes the slowest speed just before the clamping means of the tools 6, 7 open. This prevents the web from being pulled taut. Further, the suction air acting on the suction roller 15 can be rhythmically switched to a strong and weak suction effect so that the web 1 or the chain of sacks may slip on the suction roller 15 if unusual tensile loads arise out of the web being pulled taut.

This stress compensation can also be achieved by a jockey roller 82 which extends over the width of the web 1 or chain of sacks and at the ends of which there are levers 83 of which the free ends are loosely rotatably mounted on the shaft of the suction roller 15. By reason of its weight, the jockey roller 82 assumes substantially the position shown in FIG. 1. It is swung upwardly with an increase in tension of the web 1. It prevents the web 1 from being flung upwardly when suddenly pulled taut, whereby the danger of tearing would be much greater.

In the cooling section 16, the seams are cooled further. In order that the web 1 will not be pulled taut over the respective guide rollers nor sag excessively, the respective take-off rollers 75 are controlled by a control which scans the web 1. This control may consist of a perforation scanner, a sensor 76 of which can be disposed at the position shown in FIG. 1. Alternatively, it consists of two reflective light barriers 77, 78 which are disposed in the planes of the minimum and maximum sag beneath a blow pipe 79 for cooling air and, when the limits given by these planes are exceeded, appropriately influence the take-off rollers 75. The perforation scanner compares a predetermined signal with the advance of the perforations of the chain of sacks and, by means of an electric switch (not shown), controls the take-off speed of the take-off rollers 75 to be slower if the perforation signal arrives before the predetermined signal and to be more rapid if the perforation signal is retarded.

What is claimed is:

1. Device for the application of transverse weld seams to superposed webs of plastic film, preferably for the production of chains of sacks from semi-tubular plastic webs, with a plurality of tool-holders which are guided by endless chains in pairs along a planar path which is traversed by the webs, and at both sides of the webs, act in opposition to one another, enclose the webs between each other, are disposed transversely in relation to the webs, said tool holders comprising two parallel clamping bars each, between which the welding jaws of a welding tool are guided movably, characterized by the fact that, in order to form a loop, one welding jaw of the welding tool has been designed in such a way that it may be moved in between the clamping bars of the opposite tool holder.

2. Device in accordance with claim 1, characterized by the fact that, between the welding bars of the welding jaw forming the loop, a perforating knife projecting beyond the latter, has been mounted.

3. Device for the application of transverse weld seams to superposed webs of plastic film comprising:
   (a) welding means having cooperating welding jaws for applying weld seams;
   (b) a plurality of tool holders positioned in pairs on both sides of the webs, the tool holders being disposed transversely to a direction of movement of the webs and acting in opposition to each other to enclose the webs therebetween, each of said tool holders comprising:
      (1) two spaced-apart parallel clamping bars, the clamping bars of each pair of tool holders cooperating with each other to clamp webs therebetween, and
      (2) means for mounting respective ones of said welding jaws between said parallel clamping bars, welding jaws mounted in one of said tool holders being mounted for movement between the parallel clamping bars of the other tool holder of the pair of tool holders to thereby form a loop in the webs between the clamping bars; and
   (c) endless chains positioned along a planar path traversed by the webs for guiding movement of said tool holders.

4. A device according to claim 3, further comprising a perforating knife mounted between and projecting beyond the welding jaws forming the loop.

5. A device according to claim 3, wherein the superposed webs are semi-tubular plastic webs, and wherein the device produces chains of sacks from the webs.

* * * * *